(12) United States Patent
Yerramreddy et al.

(10) Patent No.: US 10,678,522 B1
(45) Date of Patent: Jun. 9, 2020

(54) COMPILER AND METHOD FOR COMPILING BUSINESS RULES FOR A SERVERLESS RUNTIME ENVIRONMENT

(71) Applicant: MOURI Tech LLC, Coppell, TX (US)

(72) Inventors: Kishore K Yerramreddy, Irving, TX (US); Srinivasu R Sandaka, Irving, TX (US)

(73) Assignee: MOURI TECH LLC, Coppell, TX (US)

( * ) Notice: Subject to any disclaimer, the term of this patent is extended or adjusted under 35 U.S.C. 154(b) by 0 days.

(21) Appl. No.: 16/221,423

(22) Filed: Dec. 14, 2018

(51) Int. Cl.
  *G06F 9/50* (2006.01)
  *G06F 9/54* (2006.01)
  *G06F 9/48* (2006.01)
  *G06F 9/44* (2018.01)
  *G06F 8/41* (2018.01)
  *G06F 8/65* (2018.01)
  *G06F 8/10* (2018.01)

(52) U.S. Cl.
  CPC ............... *G06F 8/41* (2013.01); *G06F 8/10* (2013.01); *G06F 8/65* (2013.01)

(58) Field of Classification Search
  CPC ..... H04L 67/10; H04L 63/1416; H04L 67/02; H04L 67/327; G06F 9/45558; G06F 16/162; G06F 21/53; G06F 21/602; G06F 21/604; G06F 21/6218; G06F 9/4881; G06F 9/542; G06F 9/5038; G06F 9/44526; G06F 8/71; G06F 8/34; G06F 8/41; G06F 8/10; G06F 8/65
  See application file for complete search history.

(56) References Cited

U.S. PATENT DOCUMENTS

| | | | |
|---|---|---|---|
| 7,124,145 | B2 | 10/2006 | Surasinghe |
| 7,398,237 | B2 | 7/2008 | Agostini et al. |
| 8,001,525 | B2 | 8/2011 | Agostini et al. |
| 8,387,025 | B2 | 2/2013 | Surasinghe |
| 8,495,611 | B2 | 7/2013 | McCarthy et al. |
| 8,630,969 | B2 | 1/2014 | Ziegler |

(Continued)

FOREIGN PATENT DOCUMENTS

| | | |
|---|---|---|
| CA | 2351990 A1 | 12/2002 |
| CN | 105653368 A | 6/2016 |

(Continued)

OTHER PUBLICATIONS

Baldini et al., The serverless trilemma: function composition for serverless computing, 15 pages (Year: 2017).*

(Continued)

*Primary Examiner* — Thuy Dao
(74) *Attorney, Agent, or Firm* — Nolte Intellectual Property Law Group (57) ABSTRACT

A business rules compiler receives a set of business rules designed in a business rules management system for a runtime environment associated with the business rules management system and compiles, from the set of business rules, code for the set of business rules, code for a FaaS function, and infrastructure as code, for providing to a repository in a serverless runtime environment. The infrastructure as code is for provisioning computing resources in the serverless runtime environment to enable on-demand calling of the FaaS function to execute the code for the set of business rules.

20 Claims, 4 Drawing Sheets

(56) References Cited

U.S. PATENT DOCUMENTS

| | | | |
|---|---|---|---|
| 8,666,851 B2 | 3/2014 | Carter | |
| 8,689,175 B2 | 4/2014 | Matsumoto | |
| 8,850,420 B2 | 9/2014 | Yousouf et al. | |
| 10,360,025 B2* | 7/2019 | Foskett | G06F 9/5011 |
| 10,467,435 B1* | 11/2019 | Ding | H04L 63/101 |
| 10,489,195 B2* | 11/2019 | Shimamura | G06F 9/5038 |
| 2006/0242235 A1* | 10/2006 | Classen | H04L 67/104 |
| | | | 709/204 |
| 2007/0006190 A1 | 1/2007 | Surasinghe | |
| 2008/0250411 A1 | 10/2008 | Agostini et al. | |
| 2015/0293764 A1 | 10/2015 | Visvanathan | |
| 2017/0192758 A1 | 7/2017 | Apte et al. | |
| 2017/0192777 A1 | 7/2017 | Apte et al. | |
| 2017/0193437 A1 | 7/2017 | Apte et al. | |
| 2018/0046965 A1 | 2/2018 | Berlandier | |
| 2018/0270301 A1* | 9/2018 | Zhang | G06F 9/44 |
| 2018/0329692 A1* | 11/2018 | Kimura | G06F 8/36 |
| 2019/0007458 A1* | 1/2019 | Shulman | H04L 63/1433 |
| 2019/0028552 A1* | 1/2019 | Johnson, II | H04L 45/306 |
| 2019/0079751 A1* | 3/2019 | Foskett | G06F 8/70 |
| 2019/0179678 A1* | 6/2019 | Banerjee | G06F 9/5072 |
| 2019/0188049 A1* | 6/2019 | Choudhary | G06F 8/61 |
| 2019/0332366 A1* | 10/2019 | Natanzon | G06F 8/60 |
| 2019/0342166 A1* | 11/2019 | Chaware | G06F 9/5011 |
| 2019/0349447 A1* | 11/2019 | Adams | G06F 9/547 |
| 2020/0026850 A1* | 1/2020 | Levin | G06F 16/2379 |

FOREIGN PATENT DOCUMENTS

| | | |
|---|---|---|
| CN | 107632842 A | 1/2018 |
| CN | 108491191 A | 9/2018 |
| EP | 1480121 A2 | 11/2004 |
| EP | 1480121 A3 | 7/2005 |
| JP | 2013519751 A | 5/2013 |
| WO | 2012006638 A1 | 1/2012 |

OTHER PUBLICATIONS

Mike Roberts and John Chapin; What is Serverless?; May 24, 2017; pp. 1-56; O'Reilly Media, Inc.; Sebastopol, CA, USA.
Webpage (https://blogs.sap .com/2013/10/13/dsa-decision-service-accelerator/) [online] Feb. 19, 2018, 1 page.
Webpage (https://blogs.sap .com/2017 /08/23/sap-cloud-platform-business-rules-generally-available/) [online] Aug. 23, 2017, 9 pages.
Webpage (https://en.wikipedia.org/wiki/Google_Cloud_Platform) [online] Feb. 22, 2019, 11 pages.
Webpage (https://en.wikipedia.org/wiki/Operating-system-level_virtualization) [online], retrieved on Mar. 2019, 4 pages.
Cloud Native Computing Foundation; CNCF Serverless Whitepaper; pp. 1-39; vol. 1; Cloud Native Computing Foundation; San Francisco, CA, USA, Copyright 2017.
Webpage (https://www.mouritech.com/Solution/DSA.html) [online], Copyright 2019, 4 pages.
Webpage (https://archive.sap .com/documents/docs/DOC-29158) [online]. Apr. 20, 2015, 20 pages.
Webpage (https://archive.sap.com/documents/docs/DOC-63159) [online] Aug. 8, 2016, 19 pages.
Webpage (https://archive.sap.com/documents/docs/DOC-8824) [online] Sep. 2013, 10 pages.
Webpage (https://aws.amazon.com/cli/) [online]; Copyright 2019, 6 pages.
Webpage (https://aws.amazon.com/cloudformation/) [online]; Jul. 2017, 14 pages.
Webpage (https://aws.amazon.com/s3/) [online]; Nov. 2018, 13 pages.
Webpage (https://aws.amazon.com/sdk-for-nel/) [online]; 2019, 6 pages.
Webpage (https://blogs.sap.com/2017/09/22/business-rules-united-sap-enterprise-rule-modelsap-teched-2017/) [online]; 2017, 8 pages.
Webpage (https://chrome.google.com/webstore/detail/postman/fhbjgbiflinjbdggehcddcbncdddomop) [online]; Nov. 14, 2018, 7 pages.
Webpage (https://de.wikipedia.org/wiki/Software_as_ a_Service) [online]; Feb. 18, 2019, 10 pages.
Webpage (https://docs.aws.amazon.com/lambda/latesl/dg/welcome.html) [online]; Copyright 2019, 3 pages.
Webpage (https://en.wikipedia.org/wiki/Abstract_ syntax_ tree) [online]; retrieved on Feb. 22, 2019, 4 pages.
Webpage (https://en.wikipedia.org/wiki/AWS_Lambda) [online]; retrieved on Dec. 19, 2018, 2 pages.
Webpage (https://en.wikipedia.org/wiki/Bluemix) [online]; retrieved on Feb. 18, 2019, 2 pages.
Webpage (https://en.wikipedia.org/wiki/BRFplus) [online]; retrieved on Nov. 26, 2017, 4 pages.
Webpage (https://en.wikipedia.org/wiki/Business_rule_management_system) [online]; retrieved on Nov. 14, 2018, 3 pages.
Webpage (https://en.wikipedia.org/wiki/Cloud_Foundry) [online]; retrieved on Jan. 30, 2019, 5 pages.
Webpage (https://en.wikipedia.org/wiki/Function_as_a_service) [online]; retrieved on Dec. 21, 2018, 2 pages.
Webpage (https://en.wikipedia.org/wiki/Hyperscale) [online]; retrieved on Feb. 17, 2019, 1 page.
Webpage (https://en.wikipedia.org/wiki/Kubernetes) [online]; retrieved on Feb. 26, 2019, 8 pages.
Webpage (https://en.wikipedia.org/wiki/Microsofl_Azure) [online]; retrieved on Feb. 21, 2019, 10 pages.
Webpage (https://en.wikipedia.org/wiki/OpenAPI_Specification) [online]; retrieved on Feb. 24, 2019, 3 pages.
Webpage (https://en.wikipedia.org/wiki/Oracle_Cloud_Platform) [online]; retrieved on Feb. 22, 2019, 11 pages.
Webpage (https://en.wikipedia.org/wiki/Plalform_as_a_ service) [online]; retrieved on Feb. 19, 2019, 6 pages.
Webpage (https://en.wikipedia.org/wiki/Representational_state_transfer) [online]; retrieved on Feb. 21, 2019, 6 pages.
Webpage (https://en.wikipedia.org/wiki/Serverless_computing) [online]; retrieved on Feb. 27, 2019, 6 pages.
Webpage (https://en.wikipedia.org/wiki/Webhook), [online]; retrieved on Feb. 27, 2019, 1 page.
Webpage (https://swagger.io/), [online]; Copyright 2019.
Webpage (https://swagger.io/docs/specification/2-0/adding-examples/), [online]; Copyright 2019.
Webpage (https://swagger.io/docs/specification/data-models/data-types/), [online]; Copyright 2019.
Webpage (https://wiki.scn.sap.com/wiki/pages/viewpage.action?pageId=133758980) [online]; Jul. 18, 2013.

\* cited by examiner

COMPILER AND METHOD FOR COMPILING BUSINESS RULES FOR A SERVERLESS RUNTIME ENVIRONMENT

FIELD

The present disclosure relates generally to business rules management and more particularly to a compiler and method for compiling business rules for a serverless runtime environment.

BACKGROUND

A Business Rule Management System (BRMS) is a system used to define, deploy, execute, monitor, and maintain the variety and complexity of decision logic that is used by operational or analytical systems within an organization or enterprise. This logic, also referred to as business rules, can include policies, requirements, and conditional statements that are used to determine the tactical actions that take place in applications and systems. Current BRMSs enable modeling of business rules for a runtime environment associated with the BRMS, meaning that the runtime environment is either a part of the BRMS where the design time and run time are executed on a same physical infrastructure, or the runtime environment is explicitly supported by the BRMS, wherein the business rules model is designed specifically for executing in the supported runtime environment. Accordingly, these BRMSs can be limited in at least two major respects. First, scalability is limited by the hardware available in the runtime environment and can become cost-prohibitive for some organizations as projected demand for business rule use rises. Second, to change the business rules, one or more servers with which the business rules are executed has to be taken down and restarted to execute the revised logic. This can put the server(s) out of commission up to one or more days should there be error involved, thereby wasting valuable time and computing resources.

BRIEF DESCRIPTION OF THE DRAWINGS

The accompanying figures, for which like reference numerals refer to identical or functionally similar elements throughout the separate views, together with the detailed description below, are incorporated in and form part of the specification. The figures serve to illustrate examples of concepts in the claims and to show various features and advantages of those examples.

The present disclosure is illustrated in part with examples, and is not limited by the accompanying figures. Skilled artisans will appreciate that elements in the figures are illustrated for simplicity and clarity and have not necessarily been drawn to scale. For example, the dimensions of some of the elements in the figures may be exaggerated relative to the dimensions of other elements to help to improve understanding of examples implicitly or explicitly disclosed herein. The apparatus and method components may be represented, where appropriate, by conventional symbols in the drawings, showing only those specific details that are pertinent to understanding the examples according to the present disclosure so as not to obscure the disclosure with details that will be readily apparent to those of ordinary skill in the art having the benefit of the description herein. Also, the operations included in any flow diagrams do not imply a required order in performing the functionality and/or steps contained therein.

DETAILED DESCRIPTION

Computer related functionality and/or business rules management technology is/are improved by implementing examples disclosed herein according to the present disclosure. An illustrative benefit is that business rule execution can be moved from a runtime environment associated with the BRMS used to design a model for the business rules (which may be a "server-based" or "non-serverless" runtime environment that has limited scalability and deployment flexibility) to a "serverless" computing runtime environment where scalability is more cost-effective and more efficient and which can support various deployment scenarios in terms of programming language and manner of provisioning the infrastructure, for instance.

A "serverless" runtime environment is defined as a runtime environment having at least the following three features: a Function as a Service (FaaS) platform, an API definition for interfacing the FaaS platform, and Infrastructure as Code (IaC) capability for automatically provisioning computer/computing resources to dynamically establish and tear down the runtime environment for executing a business rules module. By contrast, a "server-based" or "non-serverless" runtime environment is missing at least one of these three features. As used herein, a "module" is a block of separately maintained code, e.g., source code, which can be human-readable or non-human-readable code, and which can be created and/or saved as a file in a suitable file format. A "wrapper" is a FaaS module including at least code to call and execute a separate business rules module, and may also include additional code for executing one or more features supported by the FaaS platform including, but not limited to, logging, tracing, historization, etc.

In one example according to the present disclosure, a business rules compiler receives a set of business rules designed in a BRMS for a runtime environment associated with the BRMS. The business rules compiler compiles or translates from the set of business rules: code for the set of business rules; code for a Function as a Service (FaaS) function; and infrastructure as code (IaC) for provisioning computing resources in a serverless runtime environment to enable on-demand calling of the FaaS function to execute the code for the set of business rules. The business rules compiler provides the code for the set of business rules, the code for the FaaS function; and the IaC to the serverless runtime environment. For example, these items are uploaded as one or more files to the serverless runtime environment.

Upon receiving the files, the serverless environment can be nearly instantaneously provisioned as the runtime environment for executing the business rules instead of the rules being executed in the runtime environment associated with the BRMS. Thus, instances of executing the business rules can be scaled as needed and can be quickly (within milliseconds) set up and torn down on-demand as needed. This has the added benefit that only those computing resources that are needed are used to execute the business rules when demand for the business rules execution fluctuates. Accordingly, the serverless runtime environment can readily meet increased demands on the one hand; and one the other hand, computing resources are not idle or otherwise inefficiently allocated when demand decreases. Additionally, the IaC can be used to automate the provisioning of the serverless runtime environment to execute defined and/or revised business rules, which reduces the likelihood of errors and minimizes downtime to seconds or less for provisioning the serverless runtime environment.

Figure 1:
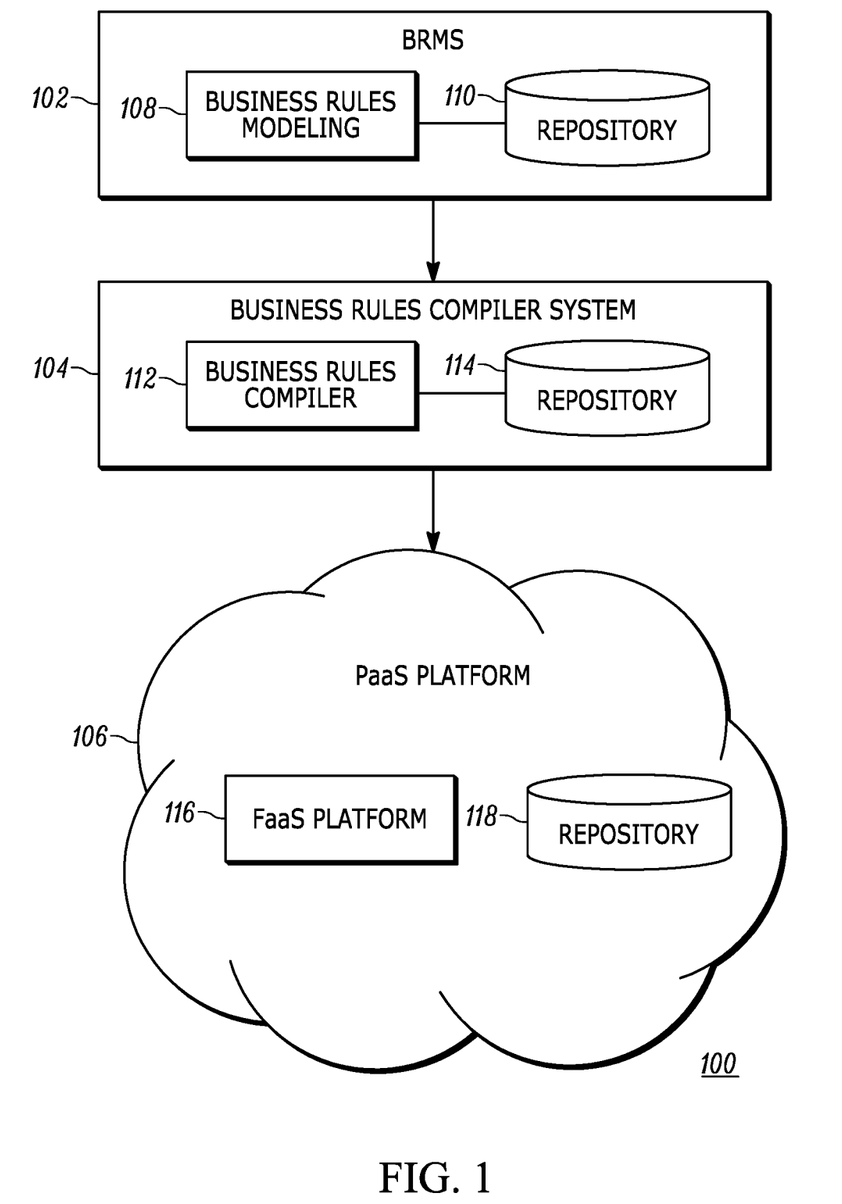
FIG. 1 depicts a computing environment that includes a business rules compiler for a serverless runtime environment, according to an example of the present disclosure.

FIG. 1 depicts a computing environment 100 that includes a business rules compiler 112, according to an example of the present disclosure. The computing environment 100 includes a business rules management system (BRMS) 102, a business rules compiler system (BRCS) 104, and a Platform as a Service (PaaS) serverless runtime environment 106. The BRMS 102, BRCS 104, and PaaS environment 106 can be coupled via one or more networks, including the Internet, wherein the BRCS 104 interfaces with both the BRMS 102 and the PaaS environment 106. In a first example, the BRCS 104 and the BRMS 102 are part of a same on-premise (e.g., operated by an enterprise or other organization), for instance a same LAN for the organization. In a second example, the BRCS 104 is a part of a network of computing devices that is separate from the LAN hosting the BRMS 102 and separate from the PaaS environment 106. In a third example, the BRCS 104 is a part of the PaaS environment 106. For all three examples, the PaaS environment 106 can be remotely accessed and provisioned using the Internet.

The BRMS 102 includes a business rules modeling component 108 and a repository 110. The business rules modeling component 108 enables the modeling of business rules for a runtime environment that is associated with the BRMS 102, for instance an on-premise runtime environment. Accordingly, the business rules modeling component models business rules with a format to enable executing in the associated runtime environment. For example, modeling component 108 includes software, executable by a suitable processing device, to define, initiate execution of, monitor, maintain, revise, test, and validate the variety and complexity of decision logic (i.e., business rules) used by operational or analytical systems within an organization. Business rules include, for instance, policies, requirements, and conditional statements that can be used to determine tactical actions that take place in applications and systems. Examples of decisions that can be automated with business rules include relationship-based pricing, credit scoring, tax calculations, claims settlement, agent commissions, fraud detection, and master data validation.

The business rules can be stored in the repository 110 to externalize or separate the decision logic from core application code that uses the decision logic. The repository 110 can also be used to store versioning and access control credentials for lifecycle management and data for auditing and reporting. Any suitable persistent memory can be used for the repository 110.

With the BRMS 102, business experts can express logic in the form of decision tables, decision flows, formulas, text rules, etc., to influence the behavior of an application or business process. The BRMS 102 can provide the tooling, for instance, user interfaces (UIs), versioning, deployment, etc., to separate application code from the business rules and thereby allow for a different lifecycle process for the business rules empowering the business users to change and update the business rules independently from the application code. By this, a business team can gain agility, improve the business rule quality, and achieve more efficiency in business processes by automating decision making. Example BRMSs 102 include, but is not limited to, SAP® BRFplus solution, SAP NetWeaver® platform, IBM® Operational Decision Manager platform, Drools, etc.

The BRCS 104 includes the business rules compiler 112 and a repository 114. In an example, the business rules compiler 112 receives and translates the business rules Defined® in the BRMS 102 into a format executable in a serverless runtime environment that supports a FaaS platform. The repository 114 can be any electronic, magnetic, optical, or other physical storage device that stores the set of business rules provided by the BRMS 102 and stores results from the business rules compiler 112 compiling the received set of business rules. Those results include code for the set of business rules, code for a FaaS function, and IaC for providing to the PaaS environment 106. An example implementation of the business rules compiler 112 is described later by reference to FIG. 2.

The PaaS serverless runtime environment 106 includes a FaaS platform 116 and a repository 118. The repository 118 is used to store, at a minimum, code for a set of business rules, code for a FaaS function, and IaC provided by the BRCS 104. Not shown, but part of the PaaS environment 106, is the configurable computing resources, both physical and virtual components (also referred to as Infrastructure as a Service (IaaS)) that are used to execute the business rules compiled and provided by the BRCS 104 in accordance with the present disclosure. The physical components of the PaaS environment 106 can include one or more processing devices such as central processing units (CPUs) and memory such as one or more databases or repositories and other persistent memory, including but not limited to hard disk drives, and may also include non-persistent memory. The virtual components can include, but are not limited to, file handles, network sockets, memory areas, virtual machines (VMs), etc. Example PaaS serverless environments 106 having FaaS capabilities include, Amazon Web Services™ (AWS™) platform, Microsoft™ Azure™ platform, Google Cloud Platform™ service, IBM® Cloud platform, etc.

The FaaS platform 116 enables a service-hosted remote procedure call that can leverage serverless computing to enable the deployment and executing of individual functions that run in response to events. Serverless computing is a computing code execution model that can fully manage starting and stopping of virtual machines as necessary to serve requests. Components of a serverless computing environment include the definition of application programming interfaces (APIs), FaaS for executing functions, and IaC provisioning computer/computing resources, including identity and access management, messaging, storage, and monitoring. Functions contain logic in the form of code. All other components can be configured with various forms of markup language or property files, for example.

Figure 2:
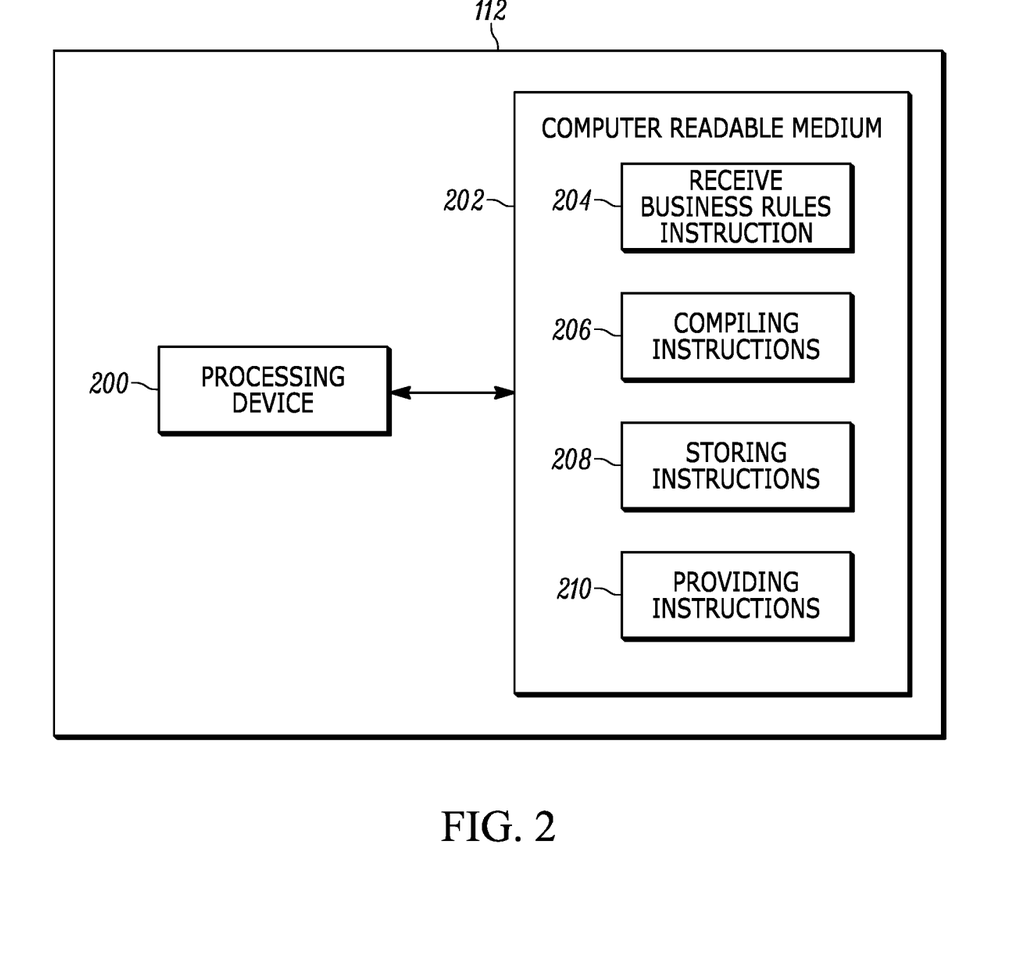
FIG. 2 depicts an exploded view of the business rules compiler of FIG. 1.

FIG. 2 depicts an exploded view of the business rules compiler 112 of FIG. 1. The business rules compiler 112 includes a processing device 200 and a computer-readable storage medium 202 storing at least receiving business rules instructions 204, compiling instructions 206, storing instructions 208, and providing instructions 210. The instructions 204, 206, 208, and 210, when executed by the processing device 200, can cause the processing device 200 to perform processes such as methods 300 and 400 illustrated by the flow diagrams shown in FIGS. 3 and 4 for receiving and compiling the set of business rules from the BRMS 102 to generate the code for the set of business rules, the code for the FaaS function, and the IaC for providing to the PaaS environment 106

The processing device 200 can include one or more CPUs, semiconductor-based microprocessor, graphics processing units, application specific integrated circuits (ASICs), and/or other hardware devices suitable for retrieval and execution of instructions, including the instructions 204, 206, 208, and 210, stored in the computer-readable storage medium 202, and combinations thereof.

The computer-readable storage medium 202 can be any electronic, magnetic, optical, or other physical storage device that contains or stores executable instructions. Thus, the computer-readable storage medium 202 can be Random Access Memory (RAM), Electrically Erasable Programmable Read-Only Memory (EEPROM), a storage drive, a Compact Disk Read Only Memory (CD-ROM), and the like. As such, the computer-readable storage medium 202 can be non-transitory.

Figure 3:
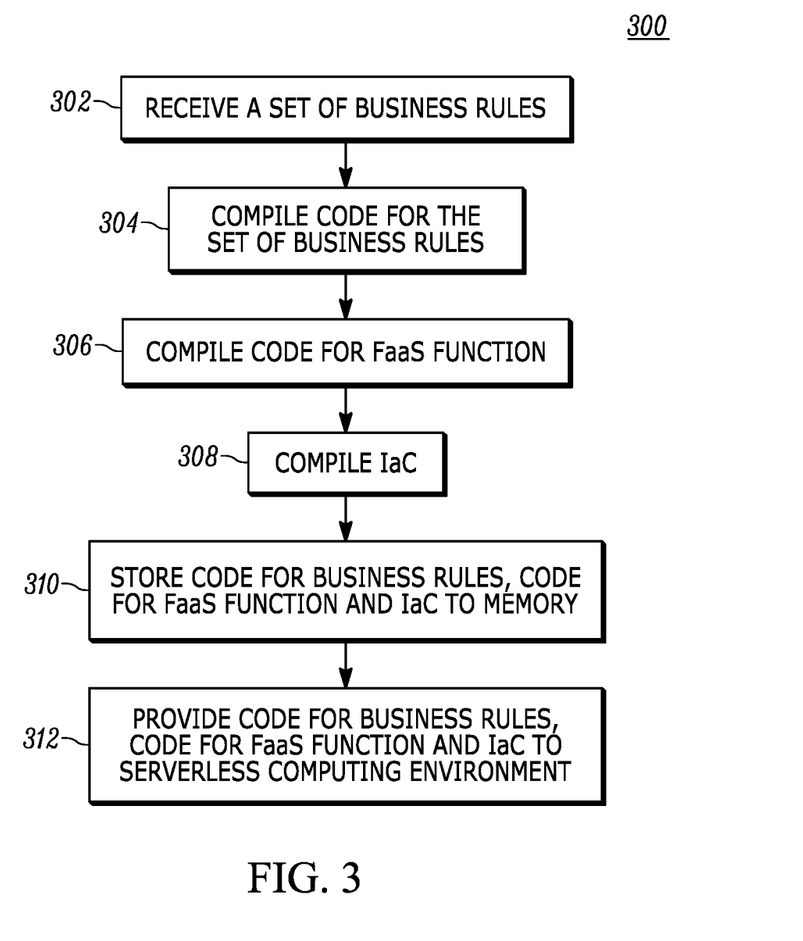
FIG. 3 depicts a flow diagram illustrating a method for compiling business rules for a serverless runtime environment, according to an example of the present disclosure.

FIG. 3 depicts a flow diagram illustrating a method 300 for compiling business rules for implementing in a serverless runtime environment, according to an example of the present disclosure. For example, the business rules compiler 112 executes the instructions 204, 206, 208, and 210 to perform the method 300. In accordance with the method 300, the business rules compiler 112 receives (302) a set of one or more business rules from the BRMS 102 (corresponding to the receive instruction 204). For example, the set of business rules is stored in the repository 110 and provided via an API between the business rules modeling component 108 and the business rules compiler 112. The business rules compiler 112 stores the set of business rules in the repository 112 for later retrieval to perform the compiling instructions 206, which in method 300 corresponds to blocks 304, 306, and 308.

The set of business rules can be in a format and/or programming language suitable for a runtime environment included with or explicitly supported by the BRMS 102. For example, the set of business rules is included within a business rule model, which is used to formally model the business rules and the way they are applied for a business process or application to automate a business decision. The business rule model provides a useful way of structuring the rules as a group that can be related to a business process or application where the rules are applied. In one example, the business rules model is a rule service having deployment and execution units for a set of related business rules logic, to form a unit of logic. The set of related business rules can contain one or more related rule sets each containing one or more rules, e.g., decision tables, flow diagrams, natural language, etc. An application that calls the rule service provides input, invokes the rule service in a runtime environment associated with the BRMS 102, and takes back output of the business rules logic as results from the rule service. In a particular example, the business rule model is contained in Extensible Markup Language (XML) or JSON file.

The business rules compiler 112 compiles, from the set of business rules, code for the set of business rules (at block 304), code for a FaaS function (at block 306), and IaC (at block 308). The FaaS function is called or invoked in response to one or more events. In an example, the FaaS function is "stateless" in that it does not keep track of previous events such that the previous events are treated as independent transactions from a current event triggering the FaaS function.

The code for the set of business rules can be considered a business rules module that is distinct from but can be called by the FaaS function, considered a separate module, both of which are loaded into and executed in a target serverless runtime environment. For example, the FaaS module is also referred to as a "wrapper" which includes code used for calling and executing the business rules module in response to events (such as an API call and/or messages). The FaaS module/wrapper can also include other code and metadata for performing functions including but not limited to compiling the business rules logic in the business rules module before executing it, mapping to enable executing the business rules logic, logging, administration of computing resources, code monitoring, automatic scaling, etc. The code for the set of business rules and the code for FaaS function can be compiled into any suitable programming language including, but not limited to, an interpreted high-level programming language such as Python® programming language or Javascript® programming language (e.g., Node.js® programming language) or another programming language such as Java™ programming language, C #, or SAP Advanced Business Application Programming (ABAP) programming language, to name a few.

The FaaS function can in turn be considered a separate module from the IaC used to provision the PaaS environment 106 computing resources to enable the calling of the FaaS module to execute the business rules module. The IaC can have any suitable format (for instance a simple text file or machine-readable definition files) to provision in an automated manner infrastructure in the PaaS environment 106 needed to create the FaaS module, the API, event registrations etc., to execute the business rules module as a FaaS function. Accordingly, the IaC includes an API definition to generate an API used to invoke the FaaS module, to provide input to the FaaS module, and to receive output from the FaaS module. The IaC can be generated using any suitable programming language including, but not limited to AWS CloudFormation™ programming language, SaltStack® programming language, Chef™ programming language, etc.

The business rules compiler 112 can use one or more templates for generating the code that is provided to the PaaS environment 106. The templates can be used to speed up the generation of the code by reusing code that stays the same. For example, a template can be used to generate at least a portion of the FaaS function (e.g. the inclusion of the rules model, generic tracing). In another example, a template is used to generate at least a portion of the IaC (e.g. creation of FaaS resources and API resources where only names and type definitions may change in the business rules module source code (used herein in some instances interchangeable with the word "code") but not the overall structure of resources and how they are combined).

The business rules compiler 112 stores (310) the code for the business rules, the code for the FaaS function, and the IaC in memory, for instance in the repository 114 (corresponding to the storing instructions 208). The business rules compiler 112 can then provides (312) the code for the business rules, the code for the FaaS function, and the IaC to the PaaS 106, for instance to the repository 118 (corresponding to the providing instructions 210). In one example, the code for the business rules, the code for the FaaS function, and the IaC are manually uploaded to the repository 118. In another example, the code for the business rules, the code for the FaaS function, and the IaC are automatically uploaded to the repository 118.

Figure 4:
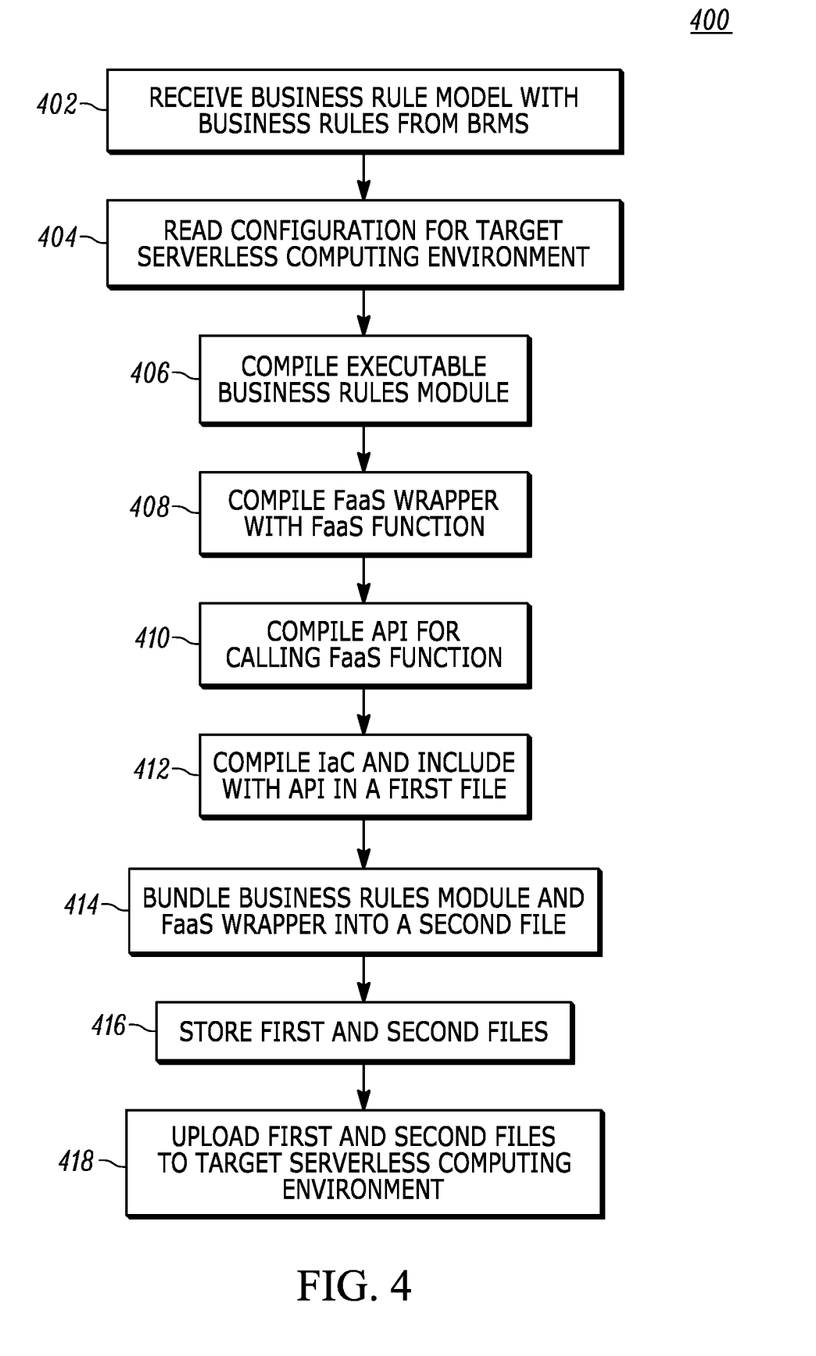
FIG. 4 depicts a flow diagram illustrating a method for compiling business rules for a serverless runtime environment, according to another example of the present disclosure.

FIG. 4 depicts a flow diagram illustrating a method 400 for compiling business rules for implementing in a serverless runtime environment, according to an example of the present disclosure. For example, the business rules compiler 112 executes the instructions 202, 204, 206, and 208 to perform the method 400. In this particular example, the received instruction 202 corresponds to block 402 of method 400. The compiling instructions 206 correspond to blocks 404, 406, 408, 410, and 412 of method 400. The storing instructions 208 correspond to block 414 and 416 of method 400, and the providing instructions 210 correspond to block 418 of method 400. In a specific example described by reference to FIG. 4, the method 400 is used to prepare code for executing a temperature conversion business rule in the PaaS environment 106.

The business rules compiler 112 receives (402) a business rule model with the temperature conversion business rule from the BRMS 102. In one example, the business rule model has an Enterprise Rule Model (ERM) format saved and provided as a JSON file. In another example, the business rules model has a BRFplus format saved and provided as an XML file. The ERM format has a head section, a Rule Service section, a data object section, a Ruleset section, and a Rule section. The head section defines the type of the document, in this example a Rule Service Version. A Rule Service Version document is used for deployment of rules into a target system where the rules are executed, for instance a target system associated with the BRMS 102. The Rule Service section defines one or more rule services. Each rule service defines a vocabulary, means input, and result data objects. The data objects can be listed by their Id. For instance, each data object in ERM is identified by a unique Id. The data object section defines one or more data objects. A data object is like a variable defining the type of a field, a structure, or a table that is exchanged between caller and rules or that holds values during rule execution.

The Ruleset section defines one or more rulesets. Rulesets contain a reference to a rule service, and they contain one or more rules. When the rule service processing is started by an application call, the rules in the ruleset are executed. The Rule section defines one or more rules. Rules contain conditions and results of one computational step. Rules can be nested. They can exist in different formats such as text rules, decision tables, formulas and flows. Any piece of logic (condition, value assignment, etc.) can be expressed by an AST section. For example, the AST section contains an Abstract Syntax Tree (AST) composed of nodes, objects, literals, and tokens. The rule assigns a value to data object RESULT, which is then returned by the Rule Service to the caller to complete the processing.

The BRFplus format is specific to an ABAP stack. A DECISION_SERVICE_MANAGEMENT section has the same purpose as the head section in the ERM document. The rest of the document is structured similarly to the ERM document into sections like Data Object, Rule, etc., but with a different sequence. For instance, an EXPRESSION section corresponds to the Rule section in ERM. Logic is expressed with XML tags as needed, as opposed to a generic and abstract format like the AST. A RULESET section is similar to the corresponding section in ERM. A FUNCTION section defines the rule service in BRFplus, which defines input (called CONTEXT_DATA_OBJECTS) and output (called RESULT_DATA_OBJECT).

The received business rule model can be used as a starting point to compile software artifacts required for a deployment of a serverless runtime environment for the business rules including FaaS, API definition, infrastructure as code, and other artifacts. The particular example business rule described herein is conversion between Fahrenheit (° F.) and Celsius (° C.) in both directions. The example contains concepts typical for business logic such as conditions and value assignment. The logic can be expressed in pseudo code as follows.

In natural language, the pseudo code can be: if direction is from C to F then result is 9/5*input+32, else F to C is assumed and result is (input−32)*5/9. Table 1 below includes a more formal representation.

TABLE 1

| | Condition | | Result |
|---|---|---|---|
| if | direction is C-to-F | then | 9/5 * input + 32 |
| else if | direction is C-to-F | then | (Input − 32) * 5/9 |

Following is a general format for modeling the temperature conversion rule in ERM:
Rule Service
Name: Fahrenheit-Celsius-Converter
Vocabulary
  Input
    Provided-Temperature
  Result
    Converted-Temperature
Data Objects
Provided-Temperature (Structure)
  Value (numeric)
  Unit (string)
Converted-Temperature (Structure)
  Value (numeric)
  Unit (string)
Rule Set
Name: Fahrenheit-Celsius-Converter Rules
Rules:
  Conversion Rule
Rule
Name: Conversion Rule
Branch 1
  If
    Provided-Temperature.Unit is "Celsius"
  then
    Converted-Temperature.Value=9/5*Provided-Temperature.Value+32
    Converted-Temperature.Unit="Fahrenheit"
Branch 2
  If
    Provided-Temperature.Unit is "Fahrenheit"
  then
    Converted-Temperature.Value=Provided-Temperature.Value−32)*5/9
    Converted-Temperature.Unit="Celsius"

The AST expression is a logical representation of the human readable business logic. It is evaluated starting with a highest node number. Due to the nesting, completion of the nodes with the smallest number is performed first as input to the higher node numbers, as shown by reference to Table 2 below.

TABLE 2

| Node | Token | Children |
|---|---|---|
| 9 | Function "update" | 7, 8 |
| 8 | Object Reference to "Converted-Temperature.Value" | |
| 7 | Function "add" | 5, 6 |
| 6 | Literal "32" | |
| 5 | Function "multiply" | 3, 4 |
| 4 | Object Reference to "Provided-Temperature.Value" | |
| 3 | Function "divide" | 1, 2 |
| 2 | Literal "5" | |
| 1 | Literal "9" | |

Referring again to method 400, in one example, to determine a target serverless runtime environment, the business rules compiler 112 reads (404) a configuration for the target serverless runtime environment from memory. For instance, the configuration is specified by a user as a text or other data file, is stored in the repository 114, and contains parameters including, but not limited to, type of API, logging, historization, tracing, execution or programming language into which the code for the set of business rules and the FaaS code is to be compiled, and target serverless runtime environment. Logging may include writing information about a caller, execution timestamp, input, output to a PaaS logging infrastructure, etc. Tracing can include, for instance, at least some of the logging features as well as a decision path inside of the business rules that can be captured and saved into a database so that business and technical experts can look at single calls or an aggregation of calls to understand possible issues in the business rules, e.g., undesired results. In an example of implementing historization, a history database can be written with inputs and results so that future changes to the business rules can be tested and simulated and compared against the written history before live execution of new versions of the business rules.

In this example, the configuration indicates that the target serverless runtime environment (e.g., the PaaS environment 106) is the AWS platform. The execution language is Python, and the type of API is a RESTful API, and in particular a HyperText Transfer Protocol (HTTP)-based RESTful API, for instance an API consistent with Swagger OpenAPI software framework, referred to herein as a Swagger API or Swagger definition. A RESTful API is an API that adheres to the Representative State Transfer (REST) architectural constraints. In an example, HTTP-based RESTful APIs are defined with: a base URL, a media type that defines state transition data elements (which could be as simple as a URL or as complex as a Java applet), standard HTTP methods (e.g., OPTIONS, GET, PUT, POST, and DELETE), and a resource, e.g., /contract/123 or decisionservice/temperature that extends the base URL. A benefit of using Python programming language is because the Python modules are much smaller and, thereby, requires significantly fewer computing resources to process as compared to modules compiled using other programming languages such as Java. Fewer computing resources compliments the FaaS feature of bringing up computing resources only when a request arrives so that little to no idle computing resources are provisioned.

From the ERM business rule model and using the configuration for the PaaS environment 106, the business rules compiler 112 compiles an executable business rules module (block 406), a FaaS wrapper containing the FaaS function (block 408), an API for calling the FaaS function (block 410), and IaC for provisioning the PaaS environment 106 (block 412). In one example, the logic in the business rules module is compiled into Python code in a separate Python file. Example source code content (but not necessarily the code syntax) is as follows:

```
# RuleService: 00000000000000000000000000000001/FAHRENHEIT_CELSIUS_CONVERTER,
#          Version 000001, 2017-12-24T21:59:43.10Z
import json
import dateutil.parser
import copy
from datetime import datetime
from decimal import *
from collections import namedtuple
# precision of decimal calculation
getcontext( ).prec = 32
# Compilation Information
COMPILATION = namedtuple('Compilation', 'VERSION TIMESTAMP')('0.0.1', '2018-
07-27T16:49:13.246272')
# Rule Service Version Information
SERVICE = namedtuple('Service',
                   'ID NAME VERSION
CHANGED')('00000000000000000000000000000001',
                                              'FAHRENHEIT CELSIUS CONVERTER',
                                              '000001',
                                              'ZIEGLERCA/2017-12-24T21:59:43.10Z')
VOCABULARY_MODEL = json.loads("'
    {
      "Input": {
        "PROVIDED_TEMPERATURE": {
          "Components":
            "VALUE",
            "UNIT"
          ],
          "Id": "00000000000000000000000000000002",
          "Name": "PROVIDED_TEMPERATURE",
          "Type": "S",
          "UNIT": {
            "BusinessDataType": "S",
            "Name": "UNIT",
            "Type": "E"
          },
```

```
              "VALUE": {
                "BusinessDataType": "N",
                "Name": "VALUE",
                "Type": "E"
              }
            }
          }
       },
       "Reference": {},
       "Result": {
          "CONVERTED_TEMPERATURE": {
             "Components": [
                "VALUE",
                "UNIT"
             ],
             "Id": "00000000000000000000000000000003",
             "Name": "CONVERTED_TEMPERATURE",
             "Type": "S",
             "UNIT": {
                "BusinessDataType": "S",
                "Name": "UNIT",
                "Type": "E"
             },
             "VALUE": {
                "BusinessDataType": "N",
                "Name": "VALUE",
                "Type": "E"
             }
          }
       },
       "RuleResult": {}
    }
''')
# Super class for a rule service module
class RuleServiceTemplate(object):
    def __init__(self, id, name, input, result, reference):
        self.id, self.name = id, name
        self.vocab = VOCABULARY_MODEL
        self.input, self.result, self.reference = input, result, reference
        self.value = {}
        for x in ['Input', 'Result']:
            for k,v in self.vocab[x].items( ): self.value[k] = None
    def process(self):                       # template method, needs redefinition
        return None
    def_round(self, value, decimals=1):
        return Decimal(str(value)).quantize(Decimal(f" 1.{'0' * int(decimals)}"),
                                     rounding=ROUND_HALF_UP).normalize( )
    def_map(self, voc, data=None):
        if voc['Type'] == 'E': return self._mapElement(voc, data)
        elif voc['Type'] == 'S': return self._mapStructure(voc, data)
        elif voc['Type'] == 'T': return self._mapTable(voc, data)
    def_mapElement(self, voc, data=None):
        if voc['BusinessDataType'] == 'N': e = Decimal(data) if data else Decimal('0')
        elif voc['BusinessDataType'] == 'S': e =str(data) if data else ''
        elif voc['BusinessDataType'] == 'B': e =bool(data) if data else False
        elif voc['BusinessDataType'] in ['D', 'T', 'U']:
            if data: e = data if type(data) is datetime else dateutil.parser.parse(data)
            else: e = {'D': datetime.min.date, 'U': datetime.min,
                        'T': datetime.min.time}[voc ['BusinessDataType']]
        return e
    def_mapStructure(self, voc, data=None):
        s = {}
        for n in voc['Components']:
            if data and n in data: s[n] = self._map(data=data[n], voc=voc[n])
            else:                  s[n] = self._map(data=None, voc=voc[n])
        return s
    def_mapTable(self, voc, data=None):
        return [self._map(data=d, voc=voc[voc['LineType']]) for d in data]
    def setInput(self, input):                # input is a dict {name: value}
        for k,v in input.items( ):
            if k in self.value:
                self.value[k] = self._map(data=v, voc=self.vocab['Input'][k])
    def getInput(self):                       # returns a dict {name: value}
        return {k:self.value[k] for k in self.vocab['Input']}
class RuleService(RuleServiceTemplate):
    def __init__(self):
        id = '00000000000000000000000000000001'
        name = 'FAHRENHEIT_CELSIUS_CONVERTER'
        input = '00000000000000000000000000000002'.split(' ')
        result = '00000000000000000000000000000003'
```

```
    reference = []
    super(RuleService, self).__init__(id, name, input, result, reference)
    self.ty00000000000000000000000000000002 = {}
    self.ty00000000000000000000000000000002['VALUE'] = Decimal(0)
    self.ty00000000000000000000000000000002['UNIT'] = ''
    self.ty00000000000000000000000000000003 = {}
    self.ty00000000000000000000000000000003['VALUE'] = Decimal(0)
    self.ty00000000000000000000000000000003['UNIT'] = ''
  def process(self):
    selfRuleService00000000000000000000000000000001( )
    key = list(self.vocab['Result'].keys( ))[0]
    return {key: self.value[key]}
    # return self.value[list(self.vocab['Result'].keys( ))[0]]
  # Text (Rule) 00000000000000000000000000000005
(TEMPERATURE_CONVERSION_RULE)
  def Rule00000000000000000000000000000005(self):
    v1 = bool(self.value['PROVIDED_TEMPERATURE']['UNIT'] == 'Celsius')
    if v1:
      v5 = Decimal(Decimal('9'))/Decimal(Decimal('5'))
      v4 = Decimal(v5) *
Decimal(self.value['PROVIDED_TEMPERATURE']['VALUE'])
      v3 = Decimal(v4) + Decimal(Decimal('32'))
      self.value['CONVERTED_TEMPERATURE']['VALUE'] = v3
      self.value['CONVERTED_TEMPERATURE']['UNIT'] = 'Fahrenheit'
      return
    v7 = bool(self.value['PROVIDED_TEMPERATURE']['UNIT'] == 'Fahrenheit')
    if v7:
      v11 = Decimal(self.value['PROVIDED_TEMPERATURE']['VALUE']) +
Decimal(Decimal('32'))
      v10 = Decimal(v11) * Decimal(Decimal('5'))
      v9 = Decimal(v10)/Decimal(Decimal('9'))
      self.value['CONVERTED_TEMPERATURE']['VALUE'] = v9
      self.value['CONVERTED_TEMPERATURE']['UNIT'] = 'Celsuis'
      return
    return None
  # Ruleset 00000000000000000000000000000004 (RULESET)
  def Ruleset00000000000000000000000000000004(self):
    self.Rule00000000000000000000000000000005( )
  # RuleService 00000000000000000000000000000001
(FAHRENHEIT_CELSIUS_CONVERTER)
  def RuleService00000000000000000000000000000001(self):
    self.value['CONVERTED_TEMPERATURE'] =
copy. deepcopy(self.ty00000000000000000000000000000003)
    self.Ruleset00000000000000000000000000000004( )
```

Once compiled, the above Python code can be executed statically or dynamically by the FaaS function, which the business rules compiler 112 compiles at block 408. In this example, the target FaaS platform is AWS Lambda. Therefore, the business rules compiler 112 creates a Lambda function in Python source code as the FaaS function, also referred to herein as a Lambda wrapper. The Lambda function can be used to run the business rules module: in response to events such as changes in data in an Amazon S3™ bucket or an Amazon DynamoDB™ table; to run the business rules module in response to HTTP requests using Amazon™ API Gateway service; or invoke the business rules module using API calls made using AWS SDKs. In one example, the business rules compiler 112 uses a template to compile a Lambda wrapper as the Lambda function in Python code, within a separate file from the Python file containing the business rules logic. A benefit of separating the two files is to keep the FaaS wrapper the same regardless of the business rules logic being executed so that new versions of the business rules logic do not require the Lambda code to be updated but only the business rules logic to be replaced.

Thereafter, in one example, the business rules compiler 112 adds to the Lambda wrapper a mapping of parameters, in this case input and output. For example, the mapping can be added because of different naming conventions and rules between the ERM and Swagger/API definition in AWS and value mapping. For instance, in the example source code below compiled for the Lambda wrapper, there is a mapping between decimal and float types because of differences in type systems of API and implementation in Python. The mapping can be done, as in this example, using Dictionary that serves as a simple mapping table or can be done by compiling the business rules logic. In another example, additional tasks can be performed in the Lambda wrapper so that the business rules module returns its results regardless of the target runtime environment. For example, tracing or logging data can be converted into a format more commonly used in the AWS PaaS environment, etc.

Accordingly, in an example, the mapping table can perform one or more functions. The functions can include, but are not limited to, input and/or output conversion between an application programming interface that calls the FaaS function and the code for the set of business rules; value conversion between the application programming interface that calls the FaaS function and the code for the set of business rules; type conversion between the application programming interface that calls the FaaS function and the code for the set of business rules; logging; tracing; and historization.

The following is example Python source code content (but not necessarily syntax) for the compiled Lambda wrapper.

```
Import boto3
import logging
import json
from decimal import Decimal
import ruleservice
INBOUND = json.loads('''
   {
     "ConvertedTemperature": "CONVERTED_TEMPERATURE",
     "ProvidedTemperature": "PROVIDED_TEMPERATURE",
     "Unit": "UNIT",
     "Value": "VALUE"
   }
''')
OUTBOUND = {v: k for k, v in INBOUND.items( )}
logger = logging.getLogger( )
logger.setLevel(logging.INFO)
logger.info('lambda function loaded')
rs = None
err = {"Errors": [{"Error": {"id": "1", "text": "No 'Input' provided in http body"}}]}
def decimal_default(obj):
   if isinstance(obj, Decimal): return float(obj)
   def convert(map, input):
      output ={}
      for k, v in input. items( ):
         if isinstance(v, list):
            output[map[k]] = []
            for entry in v:
               output[map[k]].append(convert(map, entry))
         elif isinstance(v, dict):
            output[map[k]] = convert(map, v)
         else:
            output[map[k]] = v
      return output
   def handler(event, context):
      logger.info('event: {}'.format(event))
      if 'Input' not in event:
         logging.error("No 'Input' provided in message payload")
         return {"statusCode": 400,
            "body": json.dumps(err)}
      rs = ruleservice.RuleService( )
      logging.info('INBOUND: {}'.format(INBOUND))
      input = convert(INBOUND, event['Input'])
      rs.setInput(input=input)
      output = rs.process( )
      logger.info('output: {}'.format(output))
      result = convert(OUTBOUND, output)
      logger.info('result: {}'.format(result))
      return {"statusCode": 200,
         "body": json.dumps({"Result": result}, default=decimal_default)}
         The following code implements the mapping table:
         INBOUND = json.loads('''
            {
              "ConvertedTemperature":
                 "CONVERTED_TEMPERATURE",
              "ProvidedTemperature":
                 "PROVIDED_TEMPERATURE",
              "Unit": "UNIT",
              "Value": "VALUE"
            }
         ''')
         OUTBOUND = {v: k for k, v in INBOUND.items( )}
```

The following "handler" code is used to invoke the Lambda function when the API is called. In the handler method, the input is taken from the message payload provided by the caller. It is converted into the format expected by the business rules module (changed names and technical type also possible). Then the business rules module is processed, and the result is taken back and converted again to the format as defined in the API (e.g., Swagger) for the output (changed names and technical types also possible). The result is returned to the caller.

```
def handler(event, context):
   logger.info('event: {}'.format(event))
   if 'Input' not in event:
```

-continued

```
      logging.error("No 'Input' provided
         in message payload")
      return { "statusCode": 400,
         "body": json.dumps(err)}
   rs = ruleservice.RuleService( )
   logging.info('INBOUND: {}'.format(INBOUND))
   input = convert (INBOUND, event ['Input'])
   rs.setInput(input=input)
   output = rs.process( )
   logger.info('output: {}'.format(output))
   result = convert(OUTBOUND, output)
```

```
logger.info('result: {}'.format(result))
return {"statusCode": 200,
    "body": json.dumps({"Result": result},
                    default=decimal_default)}
```

At block 410, the business rules compiler 112 compiles the API definition for calling the Lambda function from the ERM model. In this case, the compiled API is a HTTP-based RESTful API compiled using Swagger OpenAPI. In one example, a template is used, which contains the parts that are the same for all models. The template can be amended by the input and output/result definitions, as well as version and description information.

In this example, the Swagger output is added to the compiled IaC file (at block 412). Alternatively, an API can be defined that accepts a payload and returns a payload without any description in an AWS CloudFormation file, but users could not then analyze the API and write their code accordingly so that the expected payload is provided. Also, there are SDK generators for various languages and FaaS environments, such as an API generator by AWS as part of the AWS API Gateway service. However, without payload definition, the generated API is comparatively weak. Swagger OpenAPI allow a wide variety of information to be added into the API definition in the AWS CloudFormation file since Swagger OpenAPI has sections such as methods, resources, payload, return codes etc. This information can be understood by users of AWS CloudFormation, by various tools such as API visualization tools (e.g. Swagger), and by developers writing code that invokes the API.

The Swagger definition only contains the API definition. However, there are more resources required than the API definition. For example, the FaaS function also needs to be defined (e.g., what language, runtime settings), policies may be required, etc. Therefore, serverless computing providers offer services to create IaC. For example, AWS CloudFormation is used to create IaC. AWS CloudFormation allows the use of a simple text file and AWS CloudFormation service to model and provision, in an automated and secure manner, all the computing resources needed for applications. The compilation of the AWS CloudFormation content can be comparable to the compilation of the Swagger content. For example, a template file can used to create the basic structure that is the same for all rule models. Afterwards it can be amended with additional properties such as the description and the Swagger content that is inserted into the AWS CloudFormation content as a JSON file.

Using AWS Cloud platform and AWS CloudFormation enables multiple benefits. It maximizes deployment automation, including switching from a previous version of a FaaS function to a newer one. Additionally, for the deployment there are multiple options with which artifacts can be created in the serverless environment including: SDK, Command Line Interface (CLI), and Infrastructure as Code file such as AWS CloudFormation. AWS CloudFormation allows all instructions for provisioning the PaaS environment 106 infrastructure and resources to be contained in one file, which can be version controlled, archived, etc. As a result, all artifacts required are files and can therefore be easily handled by various infrastructures and processes, such as source code repositories, for example Git. The files can also be a basis for customer specific deployment workflows, e.g. deploy first into a test environment, then do tests, then release decision by manager, then deployment into production environment etc. The AWS CloudFormation file also contains some parameters, such as the stack name, so that users can deploy the stack multiple times, e.g., one with name Development, one with name Tests, and one with name Production within the same account.

The AWS CloudFormation file has several sections including a Header, Parameters to be inserted by the user to influence how the infrastructure is created, Globals, Resources, and Outputs. The Header section indicates a template version, transformations (particular to AWS CloudFormation), and a description. The Parameters to be inserted by the user to influence how the infrastructure is created section indicates an API environment and a location of the code for the Lambda function. The Globals section indicates properties that are generally valid for the content of the file. The Resources section indicates resources to be created by this AWS CloudFormation file, such as DecisionServiceAPI, and DecisionService. The DecisionServiceAPI indicates an API of the decision service, methods, API resources, API definitions (input, output, error), Content types, and Status Codes. The DecisionService indicates the serverless function (FaaS) and is connected to the API so that the API invokes the FaaS function whenever called. The Outputs indicates the AWS CloudFormation file can output information for using the service. The compiled AWS CloudFormation file can have a reference code available and used to create the infrastructure in the PaaS environment 106.

In this example, the business rules compiler 112 bundles (414) the business rules module Python file and the FaaS wrapper Python file into a first file, e.g., a single zip file and stores (416) the zip file and the AWS CloudFormation file, for instance to the repository 114. The zip file and the AWS CloudFormation file can now be uploaded (418) to the repository 118 in PaaS environment 106. For instance, the zip file and the AWS CloudFormation file are copied into an AWS S3 bucket. In one example, the upload is performed manually using the AWS web console. Afterwards the AWS CloudFormation service is used to apply the AWS CloudFormation file as a new stack. As part of the stack creation, the user is asked to insert values for the parameters as defined inside of the AWS CloudFormation file (e.g. location of the zip file in AWS S3). Additionally, the user defines a stack name and can define other properties as needed, e.g., based on corporate policies and conventions. The resources are now available and can be used, for instance using a URL, to invoke the Lambda function.

In another example, the AWS CloudFormation and zip files are automatically uploaded to create the stack. To automate the upload (at block 418), the user could provide a file with properties (e.g., stack name pattern, AWS S3 bucket location to save the zip and AWS CloudFormation files (stored at block 416) into, stagename, user credentials to access the AWS S3 bucket, etc.) having all the manual inputs of the AWS CloudFormation stack creation so that with help of the AWS SDK, the AWS CloudFormation stack could be created completely without any user involvement.

One example method of handling error situations, e.g., errors in the rule exception, is by writing logging information and returning an error code. For instance, the FaaS platform can enable logging information to the FaaS logs that can be analyzed automatically. Therefore, no additional code/complexity is needed, other than logging in the FaaS wrapper.

Another example according to the present disclosure is a non-transitory computer-readable storage medium including executable instructions that, when executed by a processor, cause the processor to operate. The processor operates to receive a business rules model comprising a set of business rules designed in a business rules management system for a runtime environment associated with the business rules management system; compile, from the business rules model: a code module comprising the set of business rules; a Function as a Service (FaaS) wrapper; and an infrastructure as code module for provisioning computing resources in a target serverless runtime environment to enable the FaaS wrapper, on-demand, to receive an input, apply the code module to the input to generate an output, and provide the output, wherein the infrastructure as code module comprise a definition of an application programming interface to provide the input to and receive the output from the FaaS wrapper; store the code module, FaaS wrapper, and infrastructure as code module for providing to a repository in the serverless runtime environment.

The compiler code can also cause the processor to read a configuration for the target serverless runtime environment apply to configuration to compile the code module, FaaS wrapper, and infrastructure as code module. The executable instructions can further cause the processor to apply an application programming interface definition contained in the configuration to compile the infrastructure as code module.

Yet another example according to the disclosure herein is a system for compiling business rules for a serverless runtime environment, the system having a memory coupled to a processor for instance using a system bus or other coupling mechanism. The processor is to: receive a set of business rules designed in a business rules management system for a runtime environment associated with the set of business rules; read the configuration for the target serverless runtime environment; compile, from the set of business rules and using the configuration for the target serverless runtime environment: code for the set of business rules; code for a Function as a Service (FaaS) function; and infrastructure as code for provisioning computing resources in the target serverless runtime environment to enable on-demand calling of the FaaS function to execute the code for the set of business rules; store the set of business rules, code for the FaaS function, and infrastructure as code to the memory for uploading to the target serverless runtime environment. The processor is further to read an application programming interface definition from the configuration; and compile the IaC to include the application programming interface definition.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendment made during the pendency of this application and all equivalents of those claims as issued.

In this document, the terms "comprises," "comprising," "has," "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. The terms "substantially," "essentially," "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

As used herein, the term "configured to," "configured with," "arranged to," "arranged with," "capable of" and any like or similar terms means that referenced elements have a physical arrangement and/or physical coupling and/or connectivity with other elements in an inactive state. This physical arrangement and/or physical coupling and/or connectivity while in the inactive state enables the elements to perform stated functionality while in the active state. Although the various device schematics shown herein depict certain example arrangement of elements, additional intervening elements, devices, features, or components may be present in an actual embodiment, assuming that the functionality of the given device is not adversely affected.

Also, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

In addition, in the foregoing Detailed Description, it can be seen that various features are grouped together in various examples for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for compiling business rules for executing in a serverless runtime environment, the method comprising:
   receiving a set of business rules designed in a business rules management system for a runtime environment associated with the business rules management system;
   compiling, from the set of business rules:
     a first module comprising code for the set of business rules;
     a second module comprising code for a Function as a Service (FaaS) function; and
     a third module comprising infrastructure as code (IaC) for provisioning computing resources in a target serverless runtime environment to enable on-demand calling of the FaaS function to receive an input, apply the code for the set of business rules to the input to generate an output, and provide the output, wherein the infrastructure as code further comprises an application programming interface definition for calling the FaaS function; and providing the code for the set of business rules, the code for the FaaS function, and the infrastructure as code to a repository in the target serverless runtime environment.

2. The method of claim 1, wherein the code for the set of business rules and the code for the FaaS function is compiled into an interpreted high-level programming language.

3. The method of claim 2, wherein the interpreted high-level programming language comprises Python programming language.

4. The method of claim 1, wherein the code for the set of business rules, the code for the FaaS function, and the infrastructure as code is provided to a repository in a Platform as a Service serverless computing environment having a FaaS platform.

5. The method of claim 1, wherein the code for the FaaS function includes a mapping table that performs at least one of:
input and/or output conversion between an application programming interface that calls the FaaS function and the code for the set of business rules;
value conversion between the application programming interface that calls the FaaS function and the code for the set of business rules;
type conversion between the application programming interface that calls the FaaS function and the code for the set of business rules;
logging;
tracing;
historization.

6. The method of claim 1 further comprising:
combining and storing the first module and the second module in a first file;
storing the third module in a second file;
uploading the first and second files to the target serverless runtime environment.

7. The method of claim 1 further comprising:
compiling an application programming interface (API) for calling the FaaS function; and
including the API in a file with the IaC.

8. The method of claim 7, wherein the API comprises a RESTful API.

9. The method of claim 8, wherein the RESTful API comprises a HyperText Transfer Protocol-based RESTful API.

10. The method of claim 1 further comprising reading a configuration for the target serverless runtime environment, wherein the compiling is performed based on the configuration for the target serverless runtime environment.

11. The method of claim 10, wherein the configuration indicates at least one of:
the target serverless runtime environment;
the application programming interface definition for calling the FaaS function; and
a programming language into which the code for the set of business rules and the code for the FaaS function is to be compiled.

12. The method of claim 1, wherein compiling the code for the FaaS function comprises applying a FaaS template for the target serverless runtime environment.

13. The method of claim 1, wherein compiling the IaC comprises applying an IaC template for the target serverless runtime environment.

14. A non-transitory computer-readable storage medium including executable instructions that, when executed by a processor, cause the processor to:
receive a business rules model comprising a set of business rules designed in a business rules management system for a runtime environment associated with the business rules management system;
compile, from the business rules model:
a code module comprising the set of business rules;
a Function as a Service (FaaS) wrapper; and
an infrastructure as code module for provisioning computing resources in a target serverless runtime environment to enable the FaaS wrapper, on-demand, to receive an input, apply the code module to the input to generate an output, and provide the output, wherein the infrastructure as code module comprise a definition of an application programming interface to provide the input to and receive the output from the FaaS wrapper;
store the code module, FaaS wrapper, and infrastructure as code module for providing to a repository in the serverless runtime environment.

15. The computer-readable storage medium of claim 14, wherein the executable instructions further cause the processor to read a configuration for the target serverless runtime environment and apply the configuration to compile the code module, FaaS wrapper, and infrastructure as code module.

16. The computer-readable storage medium of claim 14, wherein the executable instructions further cause the processor to apply an application programming interface definition contained in the configuration to compile the infrastructure as code module.

17. A system for compiling business rules for a serverless runtime environment, the system comprising:
memory having stored thereon a configuration for a target serverless runtime environment, wherein the configuration indicates an application programming interface definition;
a processor coupled to the memory to:
receive a set of business rules designed in a business rules management system for a runtime environment associated with the set of business rules;
read the configuration for the target serverless runtime environment;
compile, from the set of business rules and using the configuration for the target serverless runtime environment:
a first module comprising code for the set of business rules;
a second module comprising code for a Function as a Service (FaaS) function; and
a third module comprising infrastructure as code for provisioning computing resources in the target serverless runtime environment to enable on-demand calling of the FaaS function to receive an input, apply the code for the set of business rules to the input to generate an output, and provide the output, wherein the infrastructure as code further comprises the application programming interface definition for calling the FaaS function; and
store the set of business rules, code for the FaaS function, and infrastructure as code to the memory for uploading to the target serverless runtime environment.

18. The system of claim 17, wherein the configuration indicates a programming language into which the code for the set of business rules and the code for the FaaS function is to be compiled.

19. The system of claim 17, wherein compiling the code for the FaaS function comprises applying a FaaS template for the target serverless runtime environment.

20. The system of claim 17, wherein compiling the infrastructure as code comprises applying an infrastructure as code template for the target serverless runtime environment.

\* \* \* \* \*